(12) United States Patent
Lloyd

(10) Patent No.: US 7,720,552 B1
(45) Date of Patent: May 18, 2010

(54) VIRTUAL KNOB LEVER ARM AS ANALOG CONTROL ELEMENT

(75) Inventor: Robert F. Lloyd, Muskego, WI (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 379 days.

(21) Appl. No.: 11/422,157

(22) Filed: Jun. 5, 2006

(51) Int. Cl.
*G05B 11/01* (2006.01)
*G05B 15/02* (2006.01)
*G06F 3/041* (2006.01)

(52) U.S. Cl. .................. 700/10; 345/173; 345/184; 345/156

(58) Field of Classification Search .............. 700/10, 700/180; 345/56, 156, 173, 184, 619, 649, 345/650, 660, 676, 678, 689; 455/151.1–151.4, 455/156.1, 157.1, 158.2, 158.4
See application file for complete search history.

(56) References Cited

U.S. PATENT DOCUMENTS

| | | | |
|---|---|---|---|
| 5,513,095 A | 4/1996 | Pajonk | |
| 5,576,946 A * | 11/1996 | Bender et al. | 700/17 |
| 5,670,987 A | 9/1997 | Doi et al. | |
| 5,745,116 A * | 4/1998 | Pisutha-Arnond | 715/863 |
| 5,956,665 A | 9/1999 | Martinez et al. | |
| 5,966,532 A | 10/1999 | McDonald et al. | |
| 6,002,104 A * | 12/1999 | Hsu | 219/130.5 |
| 6,262,711 B1 | 7/2001 | Cohen et al. | |
| 6,282,455 B1 | 8/2001 | Engdahl | |
| 6,292,712 B1 | 9/2001 | Bullen | |
| 6,675,001 B2 * | 1/2004 | Hudecek et al. | 455/150.1 |
| 6,940,486 B2 | 9/2005 | Cohen et al. | |
| 2002/0131768 A1 * | 9/2002 | Gammenthaler | 386/107 |
| 2002/0135565 A1 * | 9/2002 | Gordon et al. | 345/169 |
| 2004/0056896 A1 | 3/2004 | Doblmayr et al. | |
| 2005/0179651 A1 * | 8/2005 | Ludwig | 345/156 |
| 2008/0122799 A1 * | 5/2008 | Pryor | 345/173 |

\* cited by examiner

*Primary Examiner*—Paul L Rodriguez
*Assistant Examiner*—Sheela Rao
(74) *Attorney, Agent, or Firm*—Turocy & Watson LLP; Alexander R. Kuszewski; John M. Miller

(57) ABSTRACT

The claimed subject matter provides a system and/or method that facilitates providing analog control within an industrial automation environment. An interface component can facilitate the receipt of data relating to an input. An analog lever component can be communicatively coupled to the interface component to provide analog control of a parameter associated with the industrial automation environment, wherein the analog control correlates the input with a virtual knob to adjust the parameter.

22 Claims, 11 Drawing Sheets

VIRTUAL KNOB LEVER ARM AS ANALOG CONTROL ELEMENT

TECHNICAL FIELD

The subject invention relates to industrial control systems and, more particularly, to providing analog control within an interface via a user input.

BACKGROUND

Due to advances in computing technology, businesses today are able to operate more efficiently when compared to substantially similar businesses only a few years ago. For example, internal networking enables employees of a company to communicate instantaneously by email, quickly transfer data files to disparate employees, manipulate data files, share data relevant to a project to reduce duplications in work product, etc. Furthermore, advancements in technology have enabled factory applications to become partially or completely automated. For instance, operations that once required workers to put themselves proximate to heavy machinery and other various hazardous conditions can now be completed at a safe distance therefrom.

Further, imperfections associated with human action have been minimized through employment of highly precise machines. Many of these factory devices supply data related to manufacturing to databases or web services referencing databases that are accessible by system/process/project managers on a factory floor. For instance, sensors and associated software can detect a number of instances that a particular machine has completed an operation given a defined amount of time. Further, data from sensors can be delivered to a processing unit related to system alarms. Thus, a factory automation system can review collected data and automatically and/or semi-automatically schedule maintenance of a device, replacement of a device, and other various procedures that relate to automating a process.

To quickly and easily effectuate control of a system or process within industrial automation environments, equipment manufacturers typically create specialized human-machine interfaces (HMIs) that are employed by operators to deliver commands to industrial systems/processes and/or receive data from industrial systems/processes. In other words, HMIs provide an essential communication link between operators and automation devices, wherein such HMIs enable operators to, among other things, implement and control devices and receive feedback by monitoring device status and health during operation. Without these interfaces, high-level industrial automation would be difficult if not impossible to achieve.

Over time, HMIs have undergone several and drastic changes. For instance, a push-button that commissions and de-commissions a machine is a simplest form of a HMI, and these interfaces have been existent for several years. Terminals were later designed that displayed text messages to end users, wherein such messages are indicative of a process performed by a server or processor associated with an automation device. For example, a failed device can generate an internal error code representing a determined error which can then be matched with a particular error message. This message can thereafter be displayed to an operator on a display device. Development of client-side processing has enabled graphical depictions of status and control commands to operators, which has shifted a burden from an automated device or associated processor to a client-side graphical user interface. These graphical user interfaces improve an ability of users to access information quickly and easily.

SUMMARY

The following presents a simplified summary of the claimed subject matter in order to provide a basic understanding of some aspects described herein. This summary is not an extensive overview, and is not intended to identify key/critical elements or to delineate the scope of the claimed subject matter. Its sole purpose is to present some concepts in a simplified form as a prelude to the more detailed description that is presented later.

The subject innovation relates to systems and/or methods that facilitate providing analog control within an industrial automation environment. An analog lever component can receive data via an interface to provide analog control utilizing a virtual knob that can simulate a physical rotary device (e.g., dial, potentiometer, etc.). The analog control can provide analog settings in a manner substantially similar to that of a physical knob and/or dial-style component. The data received can be, but is not limited to, a cursor input, a user input, a device input, a coordinate associated with a display, a mouse input, a touch-screen input, a stylus input, etc. The analog lever component can correlate the data received with a setting and/or configuration for the analog control to adjust. For instance, the analog control can relate to a device within an industrial automation environment, wherein any data received can initiate changes and/or manipulations to such control. The device can be, but is not limited to, a human machine interface (HMI), a computer, a disparate controller, a roller, a station, a welder, a scanner, a belt conveyor, a pump, a press, a fan, a furnace, a cooler, a valve, an electrical component, a drain, a photo eye, etc., or any other suitable device utilized in automation systems. Furthermore, the device can be controlled by the PLC, wherein the PLC can contain software components and hardware components having inputs and/or outputs that can be utilized in connection with automating an industrial manufacturing device/process.

In accordance with an aspect of the claimed subject matter, the analog lever component can provide analog adjustment for a parameter within the industrial automation environment. The data received via the interface can be a user input associated with a mouse, input device, stylus, touch-screen, coordinate related to display, etc. The user input can be correlated with the virtual knob to provide analog control within an industrial automation environment. For example, the virtual knob can be manipulated by the user input, wherein movements can be utilized to adjust a parameter that the virtual knob is representing. In particular, a rotary movement after selecting the virtual knob can initiate an increase and/or decrease for the parameter setting. Thus, a clockwise user input can provide an increase in the parameter just as such clockwise movement would increase the analog control for a physical rotary device.

In accordance with another aspect of the innovation described herein, the analog lever component can further provide a step-size/resolution/magnitude adjustment for the value change and/or adjustment of the parameter within the industrial automation environment. For instance, the user input can be utilized to increase and/or decrease a step-size/resolution/magnitude related to the value change for the virtual knob. In particular, the distance from the user input and a center portion of the virtual knob can be utilized to change step-size, resolution, and/or magnitude of the value change. A large distance can correlate to a small step-size/resolution/magnitude; while a small distance can correlate to a large step-size/resolution/magnitude. In another example, the large distance can correlate to a large step-size/resolution/magnitude; while a small distance can correlate to a small step-size/resolution/magnitude. In other aspects of the claimed subject matter, methods are provided that facilitates providing analog control within an industrial automation environment.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION

Figure 1:
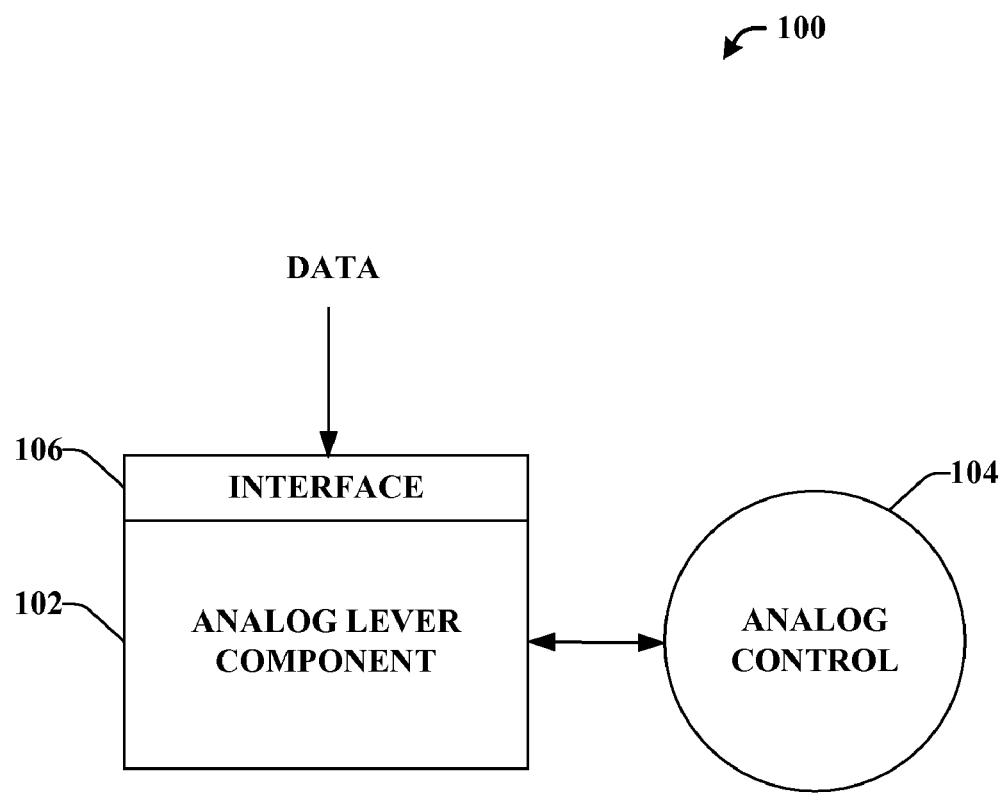
FIG. 1 illustrates a block diagram of an exemplary system that facilitates employing analog control utilizing a virtual knob.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the invention.

As used in this application, the terms "component" and "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Turning now to the drawings, FIG. 1 illustrates a system 100 that facilitates employing analog control utilizing a virtual knob. The system 100 can include an analog lever component 102 that can receive data (e.g., a user input, an input device coordinate, a mouse input, etc.) via an interface component 106 (herein referred to as the interface 106 and discussed infra) to employ an analog control 104 utilizing a virtual knob. The analog lever component 102 can correlate the data received with a setting and/or configuration for the analog control 104. For instance, the analog control 104 can relate to a device within an industrial automation environment, wherein any data received can initiate changes and/or manipulations to such control. The analog control 104 can provide analog settings in a manner substantially similar to that of a physical knob and/or dial-style component.

In one example, the analog lever component 102 can receive a user input from, for instance, a mouse, a stylus, a touch-screen, a coordinate associated with a display, etc. The user input received can be associated with a virtual knob such that the user input can correlate to an analog setting and/or adjustment. In particular, a user can utilize a mouse pointer to select a virtual knob and initiate a clockwise and/or counter-clockwise motion to increase and/or decrease the parameters associated therewith. In other words, the virtual knob can mimic a physical knob allowing analog adjustments to be made by turning and/or rotating the virtual knob.

In another example, the analog level component 102 can utilize the user input to provide additional functionality to the virtual knob. The user input can correlate to provide a sensitivity and/or magnitude that relates to the rotational increase and/or decrease for the analog control. For instance, a user can utilize a mouse pointer to select a center portion of a virtual knob, wherein at least two movements (related to the mouse pointer) can provide analog control 104. The first movement can be a rotary movement to increase and/or decrease an analog setting and/or adjustment. The second movement can be a distance from the center portion of the virtual knob to increase (correlating to the distance close to the center portion) sensitivity/magnitude and/or decrease (correlating to the distance away from the center portion) sensitivity/magnitude. In other words, the rotational movement can increase the analog setting and/or adjustment with an increment of 1 unit; yet by increasing the mouse pointer distance from the center of the virtual knob, the sensitivity and/or magnitude can be decreased to, for instance, 0.5 unit increments. Thus, the magnitude and/or sensitivity of the rotation for the virtual knob can be a function of the distance that the input device (e.g., mouse, pointer, stylus, touch-screen, etc.) is from a central portion of the virtual knob.

Furthermore, it is to be appreciated that the angle which the lever arm makes with the center of the knob may not be the indicator on the knob. For instance, a user can grab (e.g., initial click) the knob at any angle and any change that occurs to this angle can match the change of the angle on the indicator hash. Thus, it is not the actual cursor coordinate that determines the knob position, but the change that occurs in the cursor that results in a change in the knob position.

It is to be appreciated that the granularity of the virtual knob can be proportional to the radial distance of the cursor (e.g., input device) from the center-of-rotation is an implicit effect. The change of value can be proportional to the change in angle of the virtual knob. Such technique offers a "lever" effect from the fact that the farther away from the center-of-rotation; the smaller a change of angle is associated with a single pixel change related to the virtual knob. Thus, moving far away (e.g., radially) can cause a subsequent orthogonal movement of at least one pixel to implicitly map to smaller changes in the angle, which allows a finer control farther out from the virtual knob. In one particular aspect of the subject innovation, the radial or orthogonal distance can be implicitly ascertained utilizing the geometry associated with the calculation.

Moreover, the analog lever component 102 can employ a plurality of virtual knobs wherein each virtual knob can relate to a particular setting and/or adjustment associated with the industrial automation environment and/or a device associated therewith. It is to be appreciated that the analog control can relate to a device (also referred to as the automation device) within an industrial automation environment. For example, the analog lever component 102 can provide analog control 104 to a particular device with various analog settings, adjustments, configurations, etc. In addition, the device can be, but is not limited to, a human machine interface (HMI), a computer, a disparate controller, a roller, a station, a welder, a scanner, a belt conveyor, a pump, a press, a fan, a furnace, a cooler, a valve, an electrical component, a drain, a photo eye, etc., or any other suitable device utilized in automation systems.

Moreover, the system 100 can include any suitable and/or necessary interface component 106, which provides various adapters, connectors, channels, communication paths, etc. to integrate the analog lever component 102 into virtually any operating and/or database system(s). In addition, the interface component 106 can provide various adapters, connectors, channels, communication paths, etc., that provide for interaction with the analog lever component 102.

Figure 2:
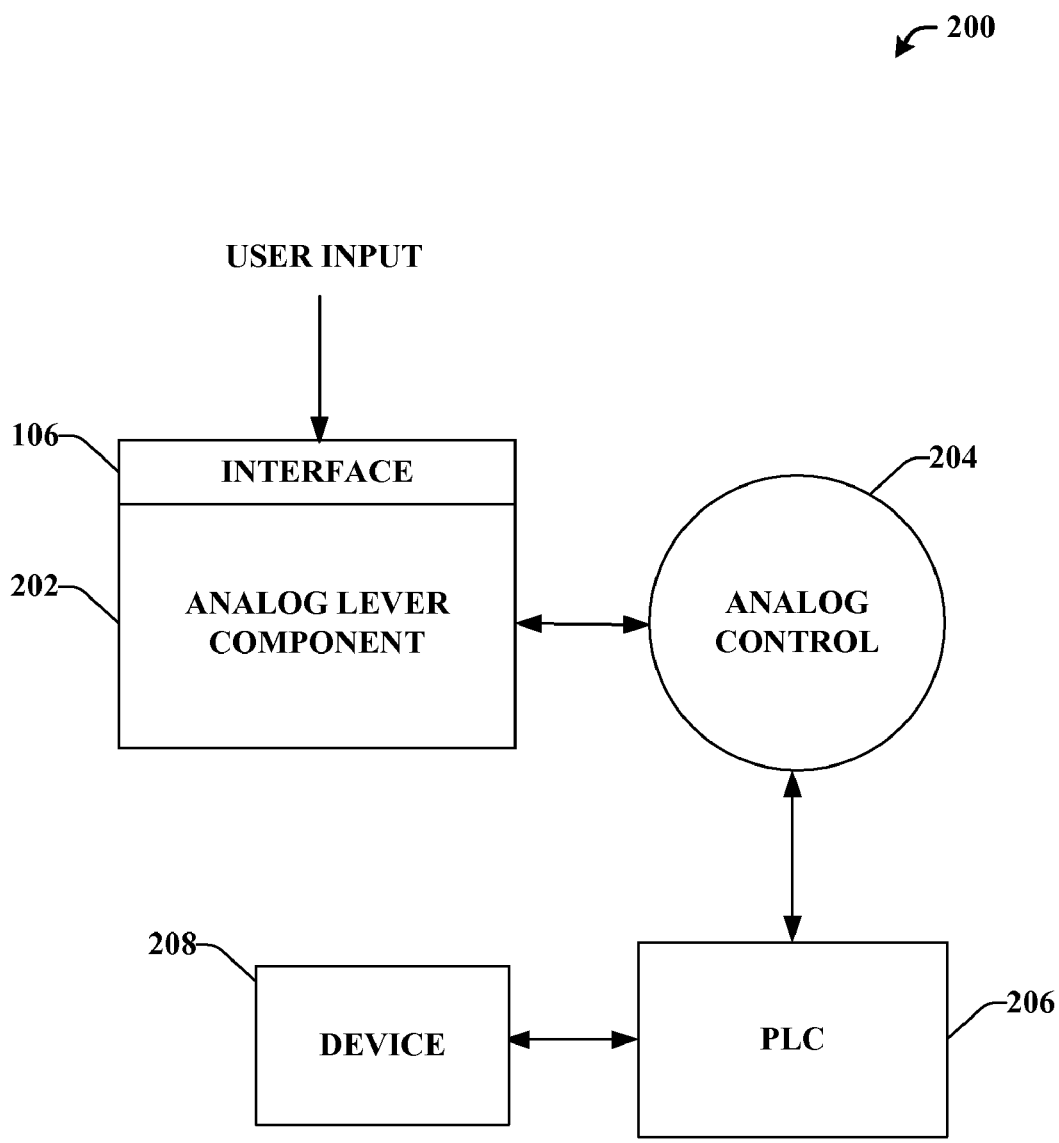
FIG. 2 illustrates a block diagram of an exemplary system that facilitates providing analog control to a device within an industrial automation environment implementing a virtual knob.

FIG. 2 illustrates a system 200 that facilitates providing analog control to a device within an industrial automation environment implementing a virtual knob. The system 200 can include an analog lever component 202 that can receive a user input via the interface 106 that can correlate with a virtual knob that provides an analog control 204. The virtual knob can allow a user input to interact therewith substantially similar to a physical knob and/or dial-type component. The user input can be, but is not limited to, a mouse input (e.g., with a click, double click, location on display, etc.), a stylus input, a touch-screen input, a coordinate associated with a screen including the virtual knob, etc. It is to be appreciated that the analog lever component 202 and the analog control 204 can be substantially similar to the analog lever component 102 and the analog control 104, respectively depicted in FIG. 1.

The analog lever component 202 can provide analog control in the form of a virtual analog knob. Once the knob is "pressed" and/or selected via through the user input, the cursor location can be captured and the cursor can act as a virtual lever arm to the knob even when the cursor is moved off of the knob itself. The change in value can be determined by the angle formed by the initial cursor position, the center of the knob, and the current cursor position. The knob can capture the cursor until the "press" is removed. Moreover, the resolution of the analog control 204 can be independent of the size of the knob itself and is limited solely by the resolution of the screen. Additionally, the knob can allow multiple revolutions, increasing and/or decreasing the range without decreasing the granularity.

The analog lever component 202 can provide two dimensions of control. Movement along the radial arm from the center of the knob to the cursor can increase and/or decrease the rate/resolution/magnitude of the value change; while movement orthogonal to the radial arm can actually change the value. It is to be appreciated that since adjustments can be made by rotation, the total range need not be limited to a fixed range. For example, the virtual knob can mimic a multi-turn potentiometer, wherein the knob can be continuously circling to provide a virtually unlimited range for adjustments. Furthermore, the analog lever component 202 can include at least one of the following: a pegging concept and/or technique (e.g., explicitly limiting the range of adjustment), a detent (e.g., allowing specific values to be selected), and center-return (e.g., allowing the knob to return to a neutral position when it is release-substantially similar to a dead man's switch).

By providing such functionality, the analog lever component 202 can allow analog values to be entered to extreme precision and/or speed. The operator and/or user can dictate the step size of the adjustment by how far or close from the center of the knob the adjustment is made. The virtual knob can also allow very natural and intuitive adjustments, mimicking the behavior of any common physical rotary device (e.g., potentiometer, dial, volume control, etc.). Furthermore, the virtual knob can define analog controls that utilize available real estate associated with a human machine interface (HMI), display, etc. far more efficiently. It is to be appreciated that the display can be, but is not limited to, a monitor, a human machine interface (HMI), an LCD, a flat-screen, a television, a portable digital assistant (PDA), a laptop, a handheld, etc. In other words, the analog lever component 202 can provide a more intuitive and compact experience with an HMI or other display in comparison to conventional techniques, HMIs, and/or displays. Thus, since the size of the virtual knob is no longer limited by the required resolution and range, more devices (knobs, sliders, data, graphical item, etc.) can be fit into a smaller area.

The analog lever component 202 can provide analog control to, for example, a device 208 within an industrial automation environment. The device 208 can be, but is not limited to, a human machine interface (HMI), a computer, a disparate controller, a roller, a station, a welder, a scanner, a belt conveyor, a pump, a press, a fan, a furnace, a cooler, a valve, an electrical component, a drain, a photo eye, etc., or any other suitable device utilized in automation systems. Furthermore, the device can be controlled by the PLC 206. It is to be appreciated that the PLC 206 can contain software components and hardware components having inputs and/or outputs that can be utilized in connection with automating an industrial manufacturing device/process. In addition, it is to be understood that the analog lever component 202 can provide analog control for a plurality of device controlled by a plurality of PLC's, and for the sake of brevity throughout the subject innovation, a single PLC 206 is depicted but the claimed subject matter is not so limited.

Figure 3:
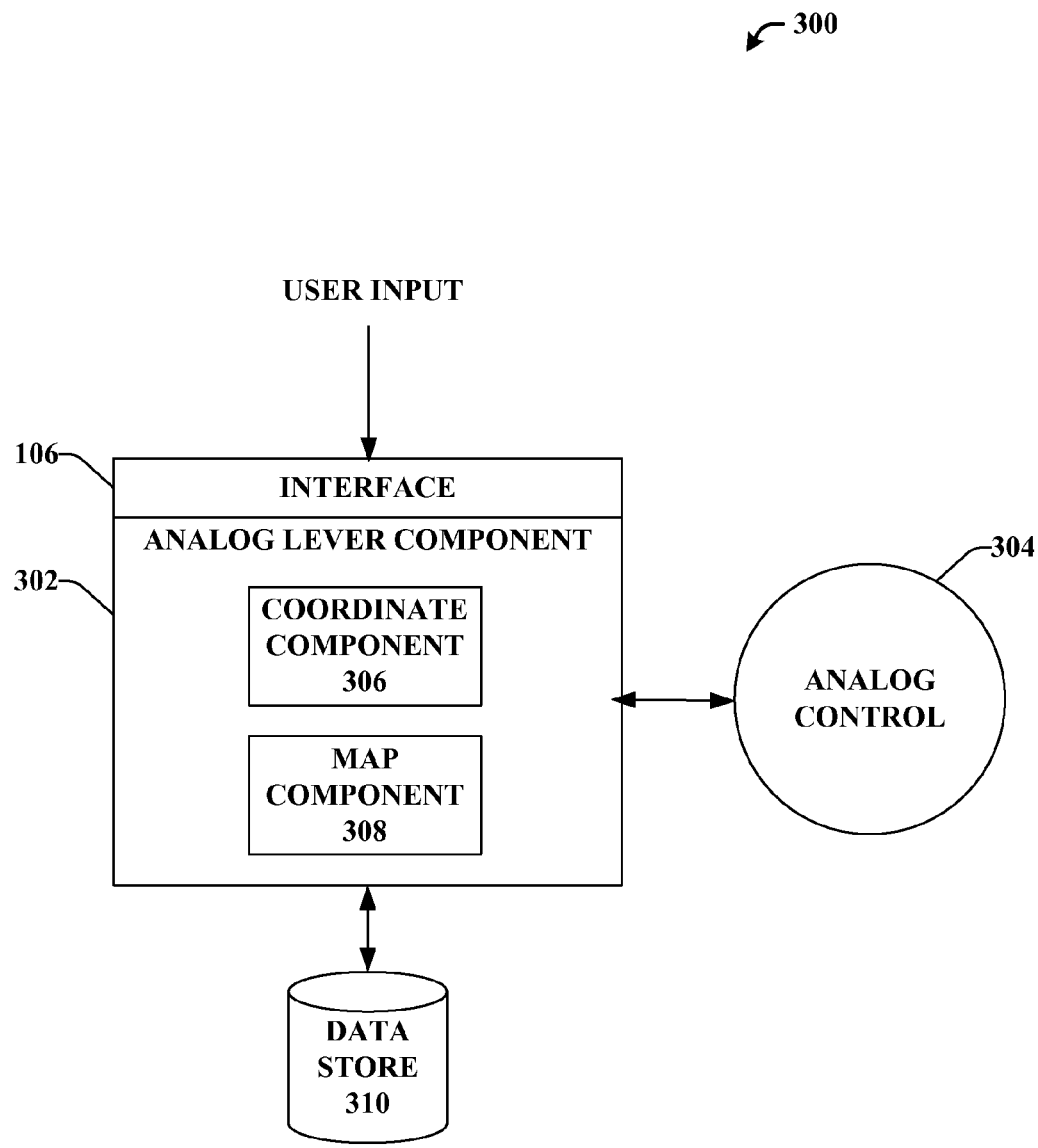
FIG. 3 illustrates a block diagram of an exemplary system that facilitates selecting analog settings associated with an industrial automation environment utilizing a virtual knob.

FIG. 3 illustrates a system 300 that facilitates selecting analog settings associated with an industrial automation environment utilizing a virtual knob. The system 300 can include an analog lever component 302 that implements a virtual knob that can correlate with a user input to provide an analog control 304. The analog control 304 can be utilized by various devices and/or components within an industrial automation environment. In particular, the virtual knob can simulate a physical knob such that a user can increase and/or decrease a setting and/or adjustment with any rotational input. Additionally, the magnitude/intensity of the increase and/or decrease increment can be adjusted based at least in part upon a cursor distance from the particular virtual knob.

The analog lever component 302 can include a coordinate component 306 that can receive a user input and determine coordinates that relate to a portion of the virtual knob. For example, a coordinate relating to an X direction and a Y direction can be ascertained, from which the movements associated with the user input can correlate to the virtual knob analog control. For example, the user input can be a mouse pointer and/or cursor from which the coordinate component 306 can ascertain a particular starting location. Moreover, the coordinate component 306 can continuously ascertain coordinates so as to allow the user input to correlate with the virtual knob analog control. Such coordinates can be utilized by a map component 308 which can provide mapping of coordinates to analog control. In other words, the map component 308 can initiate the analog control 304 based at least upon the correlation with the coordinates ascertained. Thus, if a user input moves a cursor rotationally; such data can be mapped to correlate to the amount of analog control that is associated therewith. The map component 308 can, for example, ascertain the cursor distance from the center-of-rotation, the starting point from the end-point distance (e.g., rotational angle), etc. The map component 308 facilitates determining the amount of increase for the virtual knob and/or the step-size/magnitude associated therewith based at least in part upon the coordinates related to the coordinate component 306. In another example, the map component 308 can provide the magnitude and/or step-size based on the distance from the center-of-rotation (e.g., in connection with the example of a large distance from the center-of-rotation relates to a large step-size and a small distance from the center-of-rotation relates to a small step-size).

Moreover, the system 300 can include a data store 310 that can store mappings, coordinates, settings, user profiles, virtual knob graphics, computer programming data, device settings, device configurations, optimal settings, adjustment levels, ranges, controller settings, etc. The data store 310 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 310 of the subject systems and methods is intended to comprise, without being limited to, these and any other suitable types of memory. In addition, it is to be appreciated that the data store 310 can be a server, a database, a hard drive, and the like.

Figure 4:
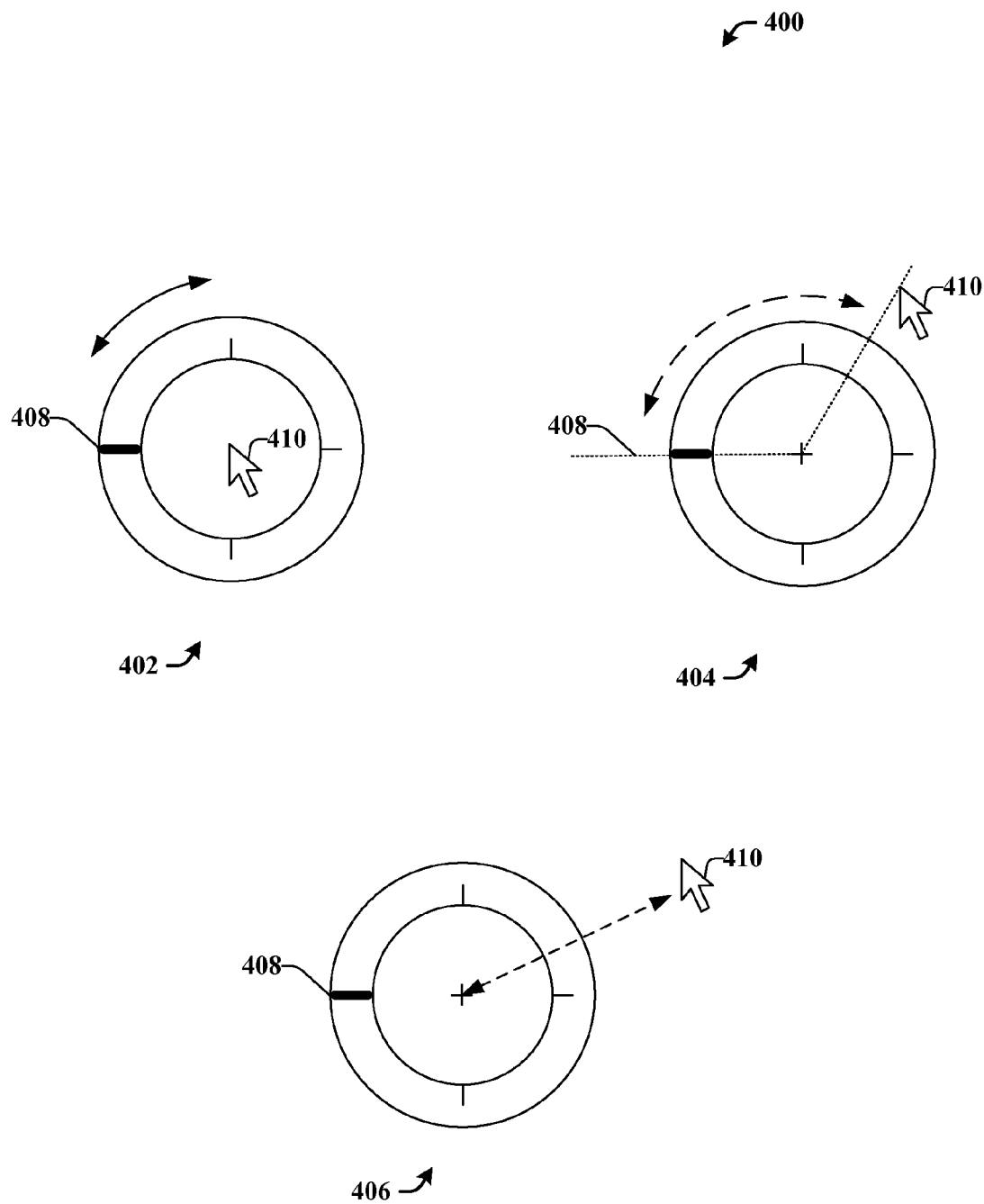
FIG. 4 illustrates a block diagram of a plurality of virtual knobs that facilitate providing analog control within an industrial automation environment.

FIG. 4 illustrates a plurality of virtual knobs 400 that facilitate providing analog control within an industrial automation environment. A first virtual knob 402 can be illustrated that can include an input cursor 410 associated with, for instance, a user, a mouse, a stylus, a touch-screen, etc. The first virtual knob 402 can have a level indicator 408 that provides a starting point to indicate an increase and/or a decrease in control in a rotational direction (indicated by the arrow in clockwise and/or counter-clockwise direction). In order to increase and/or decrease the control to which the virtual knob 402 is associated therewith, the virtual knob 402 can be selected by the input cursor 410 to allow any rotational motion to provide adjustment. A virtual knob 404 is depicted illustrating a particular distance and/or angle distance from the level indicator 408 in a clockwise direction which can correlate to a change in the analog control. In addition to providing control for increase and/or decrease of an adjustment based on rotational movement upon selecting a particular virtual knob, the magnitude and/or sensitivity of such analog control can be ascertained based at least in part upon a distance of the input cursor 410 to a center portion of the virtual knob. In particular, a virtual knob 406 is illustrated such that the input cursor 410 is a particular distance from the center portion of the virtual knob 406. The distance can correlate to the magnitude/sensitivity associated with the increment for rotational direction adjustment. In other words, the smaller the distance from the center portion of the virtual knob 406, the greater the value increases upon a change from the level indicator 408. For example, a distance of one inch from the center portion can provide increments of ten (10) units, while a distance of two inches from the center can provide increments of five (5) units for clockwise and/or counter-clockwise motion. Moreover, the further the input device and/or cursor is from the center-of-rotation, the smaller the step size. However, in another aspect, the ratio between the knob rotation angle and the lever rotation angle can be proportional to the radial distance with a default of 1:1. Thus, having a small distance from the center-of-rotation can employ a large step-size while a large distance from the center-of-rotation can implement a small step-size.

Figure 5:
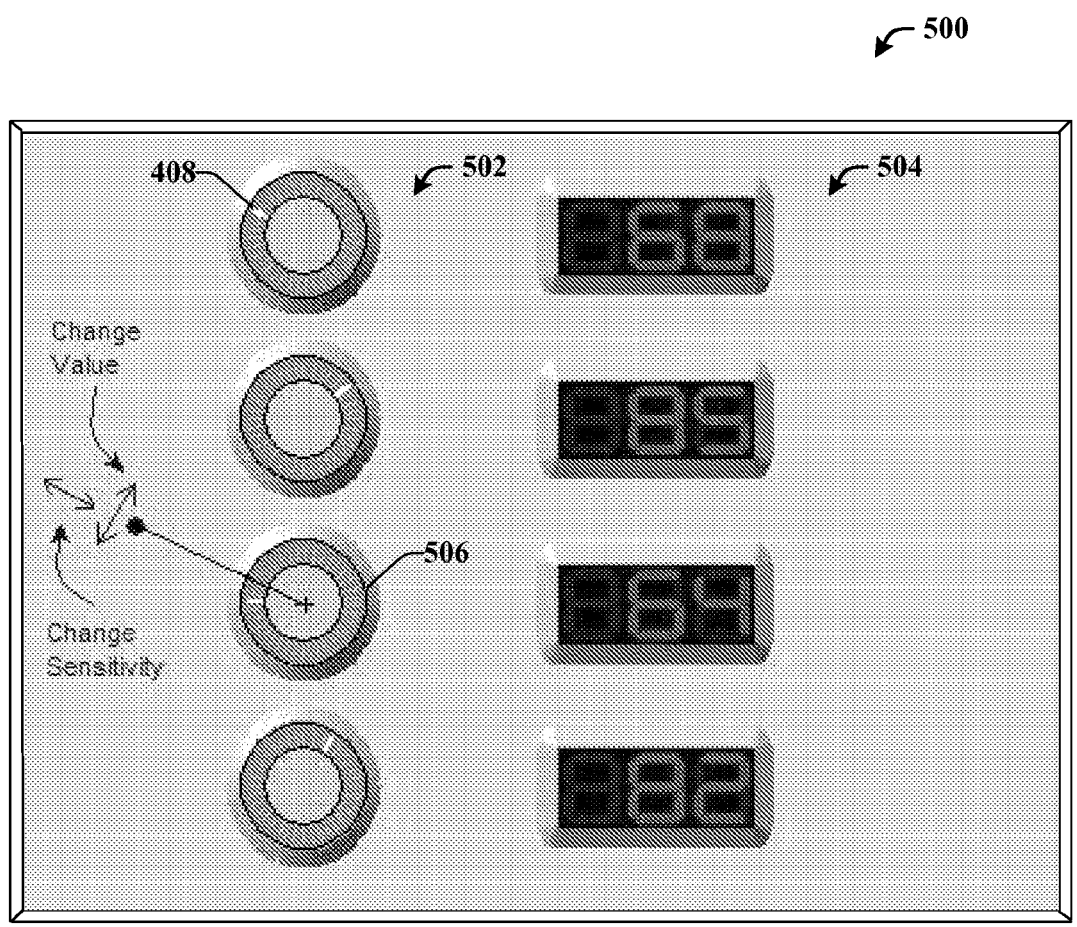
FIG. 5 illustrates an exemplary user interface that facilitates implementing a virtual knob to initiate analog control to a device.

FIG. 5 illustrates a user interface 500 that facilitates utilizing a virtual knob to initiate analog control to a device. The user interface 500 can include any number of virtual knobs 502 with respective number gauges 504 that indicate analog settings and/or readings. In particular, a first virtual knob can include the level indicator 408 that can provide a level and/or setting associated therewith. Thus, the first virtual knob with the level indicator 408 is depicted at an analog setting of 68 units as read by one of the plurality of number gauges 504. It is to be appreciated that any number of virtual knobs 502 and respective number gauges 504 can be employed by the user interface 500 and the claimed subject matter is not to be so limited by the illustrated number within the user interface 500.

A virtual knob 506 can include a level indicator depicted by a white hash on an X plane. Any rotational (e.g., clockwise and/or counter-clockwise) movement about the X plane can provide an increase and/or a decrease in an analog setting and/or control (indicated in FIG. 5 as "change value"). Moreover, the sensitivity and/or magnitude of the "change value" can be adjusted based at least in part upon a cursor distance from a center portion of the virtual knob. Thus, the distance from the center portion of the virtual knob 506 can correlate to a rate/resolution/magnitude to which the rotational movement increases and/or decreases an analog setting.

For example, a user can select the virtual knob 506 utilizing a cursor. The cursor initial position can be utilized as a set point to ascertain the amount of adjustment (e.g., change value) and a respective sensitivity. With the level indicator at the depicted position giving a reading of 64 units, the cursor can be turned clockwise to increase the unit reading or the cursor can be turned counter-clockwise to decrease the unit reading. Moreover, the distance the cursor is from the center portion of the virtual knob can provide a step size and/or unit size for the increase and/or decrease of the unit reading. Thus, a large distance from the center can correlate to a small step size (e.g., 0.1 units, 0.2 units, 0.5 units, 1 unit, etc.); while a small distance from the center can correlate to a large step size (e.g., 5 units, 10 units, 25 units, etc.).

Figure 6:
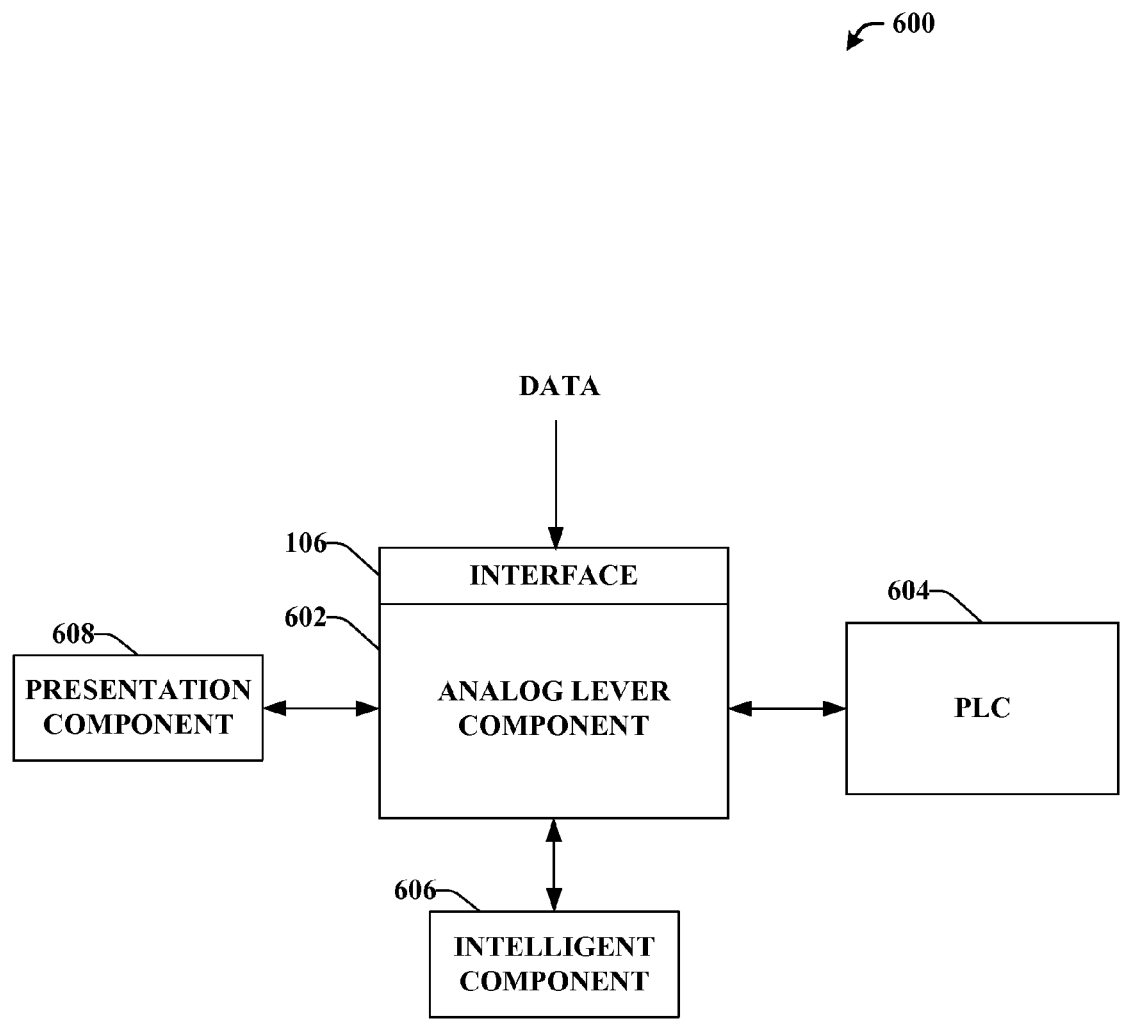
FIG. 6 illustrates a block diagram of an exemplary system that facilitates providing analog control to a device within an industrial automation environment implementing a virtual knob.

FIG. 6 illustrates a system 600 that employs intelligence to facilitate providing analog control to a device within an industrial automation environment implementing a virtual knob. The system 600 can include an analog lever component 602, a PLC 604, and an interface 106 that can all be substantially similar to respective components, controllers, and interfaces described in previous figures. The system 600 further includes an intelligent component 606. The intelligent component 606 can be utilized by the analog lever component 602 to facilitate utilizing a virtual knob to induce analog control. For example, the intelligent component 606 can infer user preferences, virtual knob configurations, optimal analog knob setting based on device controlled, pegging, ranges, detent, center-return, dead man switch behavior, virtual knob aesthetics, device optimal settings, analog settings, analog default range, analog default settings, etc.

Moreover, the intelligent component 606 can facilitate utilizing a consumption of a material and the status of such material to an operator role and/or position. For example, the intelligent component 606 can infer the consumption of raw materials utilized in the production of a particular industrial automation process and/or system. Such inference can be based at least in part upon historic data related to the consumption of materials, status and/or supply of materials, etc. Moreover, such consumption and status of materials can be communicated to an operator and/or the role of an operator.

It is to be understood that the intelligent component 606 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

A presentation component 608 can provide various types of user interfaces to facilitate interaction between a user and any component coupled to the analog lever component 602. As depicted, the presentation component 608 is a separate entity that can be utilized with the analog lever component 602. However, it is to be appreciated that the presentation component 608 and/or similar view components can be incorporated into the analog lever component 602 and/or a stand-alone unit. The presentation component 608 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled to the analog lever component 602.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 7:
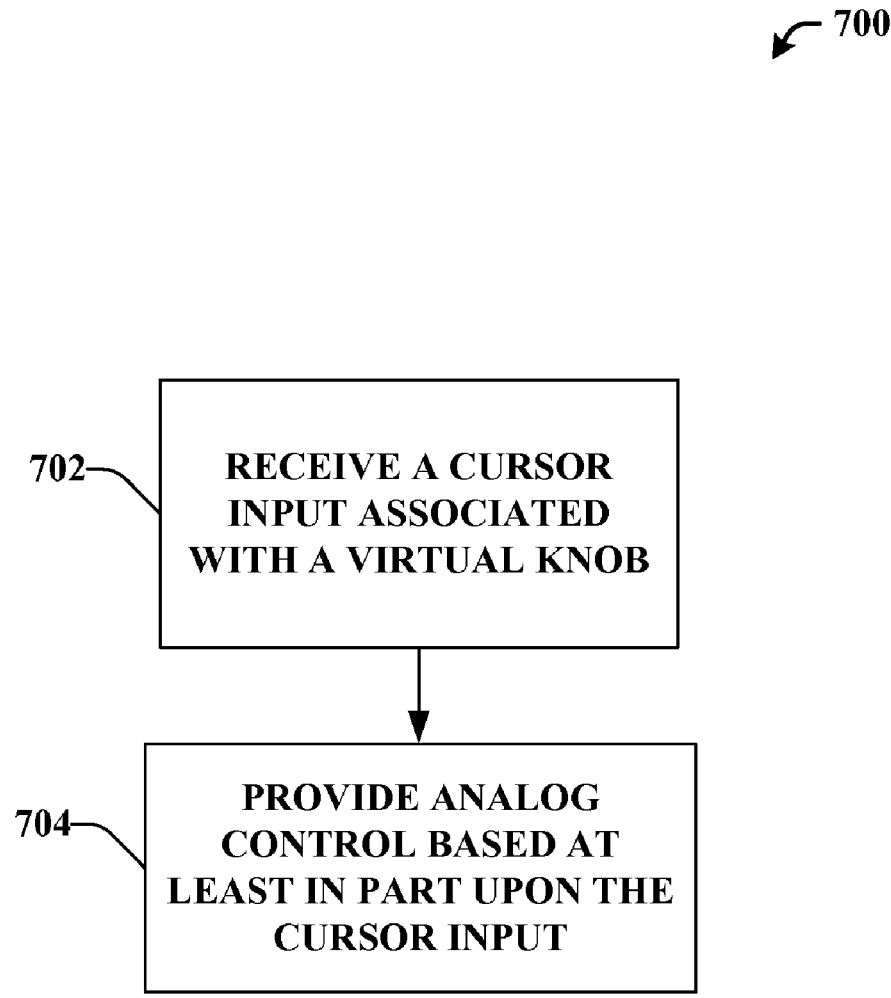
FIG. 7 illustrates an exemplary methodology for employing analog control utilizing a virtual knob.
Figure 8:
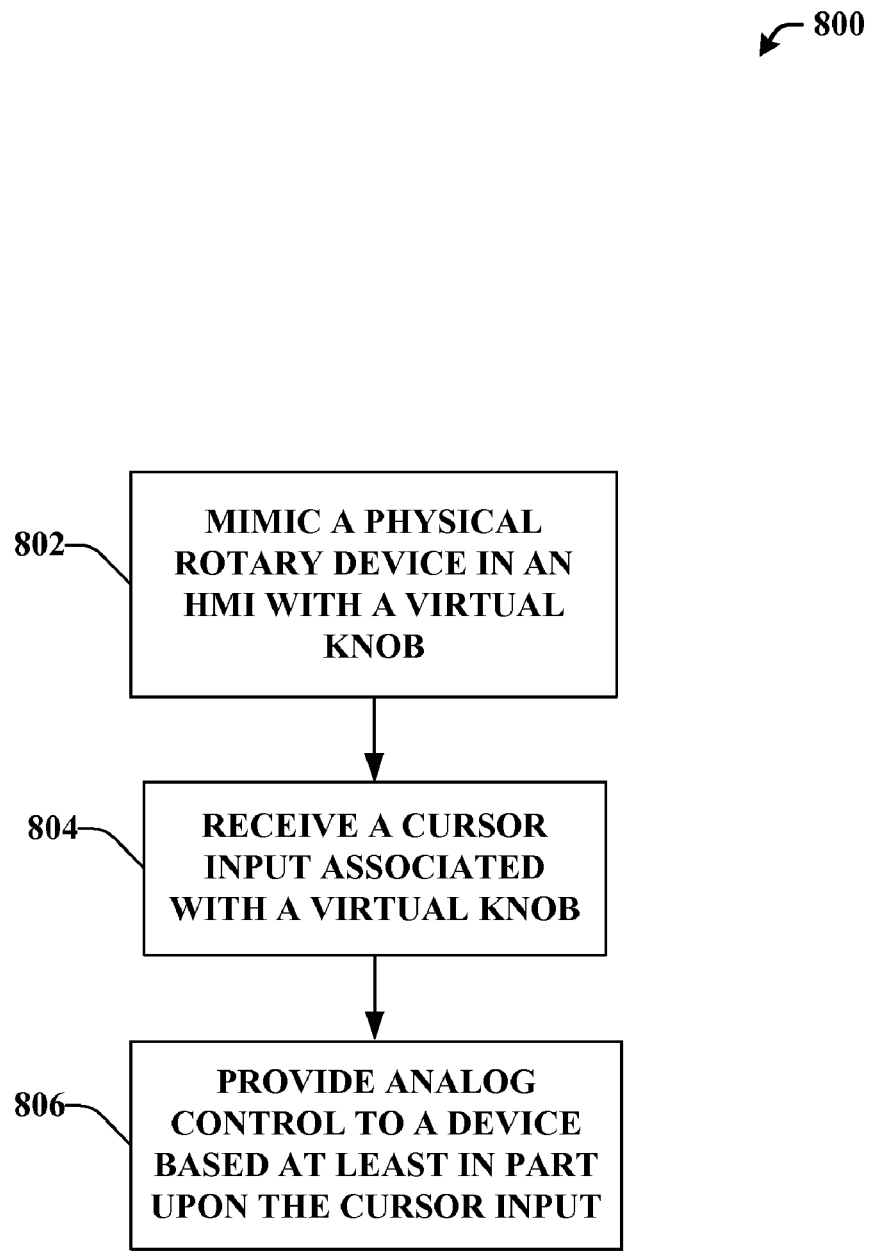
FIG. 8 illustrates an exemplary methodology that facilitates providing analog control to a device within an industrial automation environment implementing a virtual knob.
Figure 9:
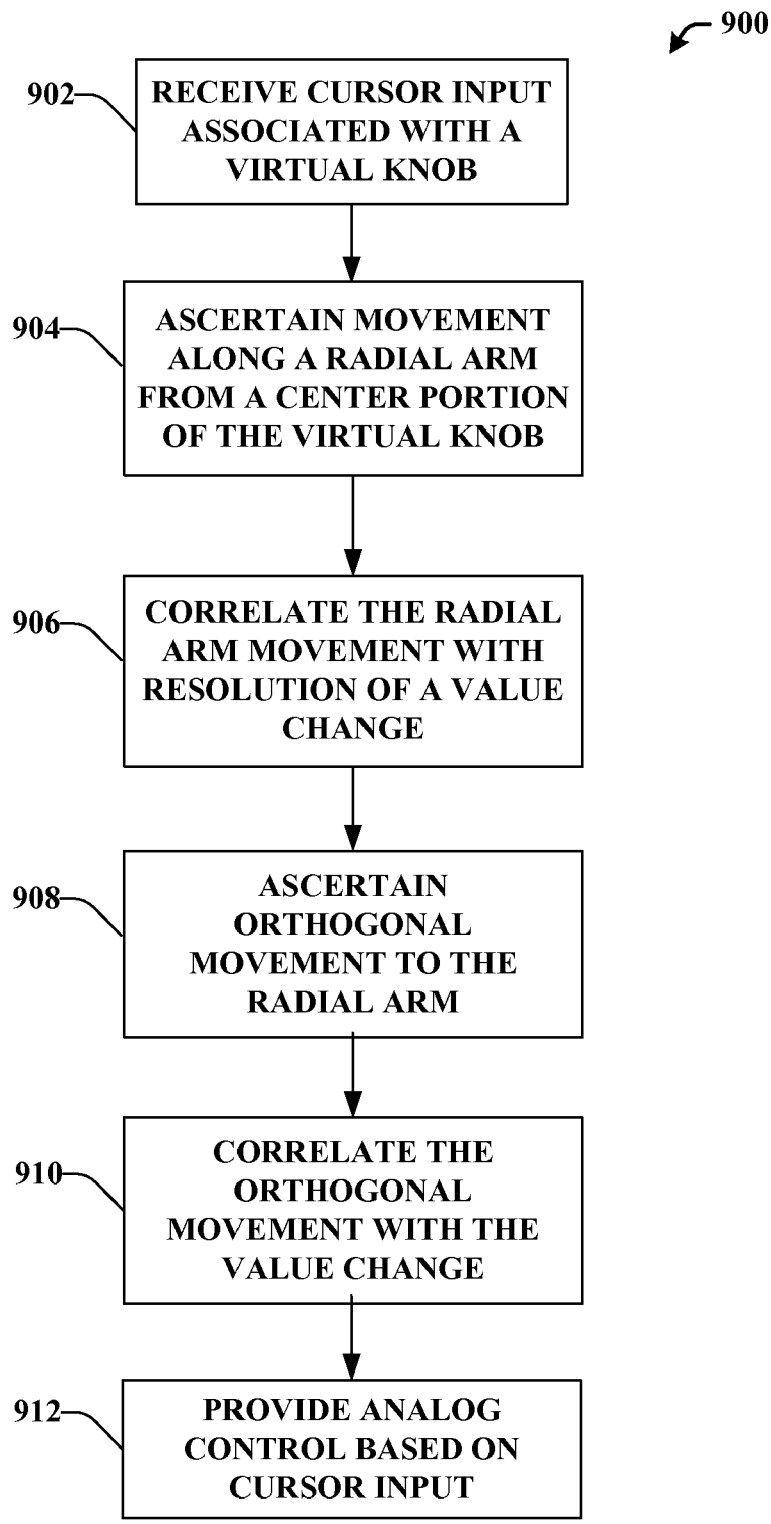
FIG. 9 illustrates an exemplary methodology that facilitates employing a virtual knob within a user interface to initiate an analog control.

Referring to FIGS. 7-9, methodologies in accordance with various aspects of the claimed subject matter are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning specifically to FIG. 7, a methodology 700 is illustrated for employing analog control utilizing a virtual knob. At reference numeral 702, a cursor input associated with a virtual knob can be received. The cursor input can be related to any suitable input device such as, but not limited to, a user, a mouse, a stylus, a touch-screen, a trackball, a voice-command, a coordinate related to a display location, etc. Moreover, the virtual knob can simulate a physical rotary device allowing a virtual representation and implementation within an industrial automation environment. For instance, any setting and/or configuration can be simulated by a virtual knob, wherein a change associated with the virtual knob can imitate changes with a physical knob within an industrial automation environment.

At reference numeral 704, analog control can be provided based at least in part upon the cursor input received. For instance, a virtual knob can be selected via the cursor input, wherein upon selection, the cursor input can correlate to the analog adjustment (e.g., value change) within the industrial automation environment. A rotational movement about the cursor selection point can provide an increase and/or a decrease associated with the analog control in which such action is substantially similar to controlling a physical rotary component (e.g., a dial, a knob, a potentiometer, etc.). In addition, the cursor input can be utilized to initiate a sensitivity/resolution/magnitude for the increase and/or decrease related to the rotational movement, wherein a distance from a center portion of the virtual knob can correlate to the resolution/magnitude/step size/sensitivity of the virtual knob.

FIG. 8 illustrates a methodology 800 that facilitates providing analog control to a device within an industrial automation environment implementing a virtual knob. At reference numeral 802, a physical rotary device in a human machine interface (HMI) can be simulated and/or mimicked therein with a virtual knob. It is to be appreciated that the HMI can be any suitable display component capable of displaying the virtual knob and receiving input data. The virtual knob can be a graphical representation of a physical knob in the sense that an input device can interact therewith to provide functionality substantially similar to that of the physical rotary device (e.g., a dial, a potentiometer, a dial-component, etc.).

At reference numeral 804, a cursor input associated with the virtual knob can be received. For instance, the cursor input can be received via any input device such as, but not limited to, a mouse, a stylus, a touch-screen, a trackball, etc. The cursor input can select a particular virtual knob to activate control and/or to initiate adjustment of settings and/or value changes. At reference numeral 806, analog control can be provided to a device based at least in part upon the cursor input. It is to be appreciated that the device can be, but is not limited to, a human machine interface (HMI), a computer, a disparate controller, a roller, a station, a welder, a scanner, a belt conveyor, a pump, a press, a fan, a furnace, a cooler, a valve, an electrical component, a drain, a photo eye, etc., or any other suitable device utilized in automation systems. Furthermore, the device can be controlled by a PLC. It is to be appreciated that the PLC can contain software components and hardware components having inputs and/or outputs that can be utilized in connection with automating an industrial manufacturing device/process.

Thus, the cursor input can select the virtual knob and provide a value change with a sensitivity and/or magnitude associated therewith. Specifically, the virtual knob can be selected by placing an input device cursor over the virtual knob and initiating a selection (e.g., a click, a press, a double-click, etc.). Once selected, the cursor input can then provide analog control with an increase and/or a decrease in a value, adjustment, and/or setting with a rotational movement about the virtual knob on the HMI. Moreover, the sensitivity and/or magnitude of the increase and/or decrease in value can be manipulated based at least in part upon the cursor distance from a center portion of the virtual knob.

FIG. 9 illustrates a methodology 900 that facilitates employing a virtual knob within a user interface to initiate an analog control. At reference numeral 902, a cursor input can be received, wherein the cursor input can be associated with a virtual knob. The cursor input can be related to any suitable input device that can interact with the virtual knob. For example, the cursor input can be related to a mouse, a trackball, a touch-screen, a stylus, etc. At reference numeral 904, movement along a radial arm from a center portion of the virtual knob can be ascertained. After a particular virtual knob is selected via the cursor input, the cursor input can further provide movement along the radial arm from the center portion of the virtual knob. At reference numeral 906, the radial arm movement from the center portion can correlate with a resolution/step-size/magnitude of a value change controlled by the virtual knob. Thus, a small distance from the radial arm can correlate to a small resolution/step-size/magnitude; while a large distance from the radial arm can correlate to a large resolution/step-size/magnitude.

At reference numeral 908, orthogonal movement to the radial arm can be ascertained from the cursor input. The orthogonal movement can be, for example, rotational movement in a clockwise and/or counter-clockwise motion. At reference numeral 910, the orthogonal movement from the cursor input can correlate with the value change the virtual knob controls. Thus, the orthogonal movement ascertained from the cursor input can correlate to the value change (e.g., utilizing the ascertained resolution/step-size/magnitude). At reference numeral 912, analog control can be provided utilizing the cursor input and associated radial arm movement and orthogonal movement.

Figure 10:
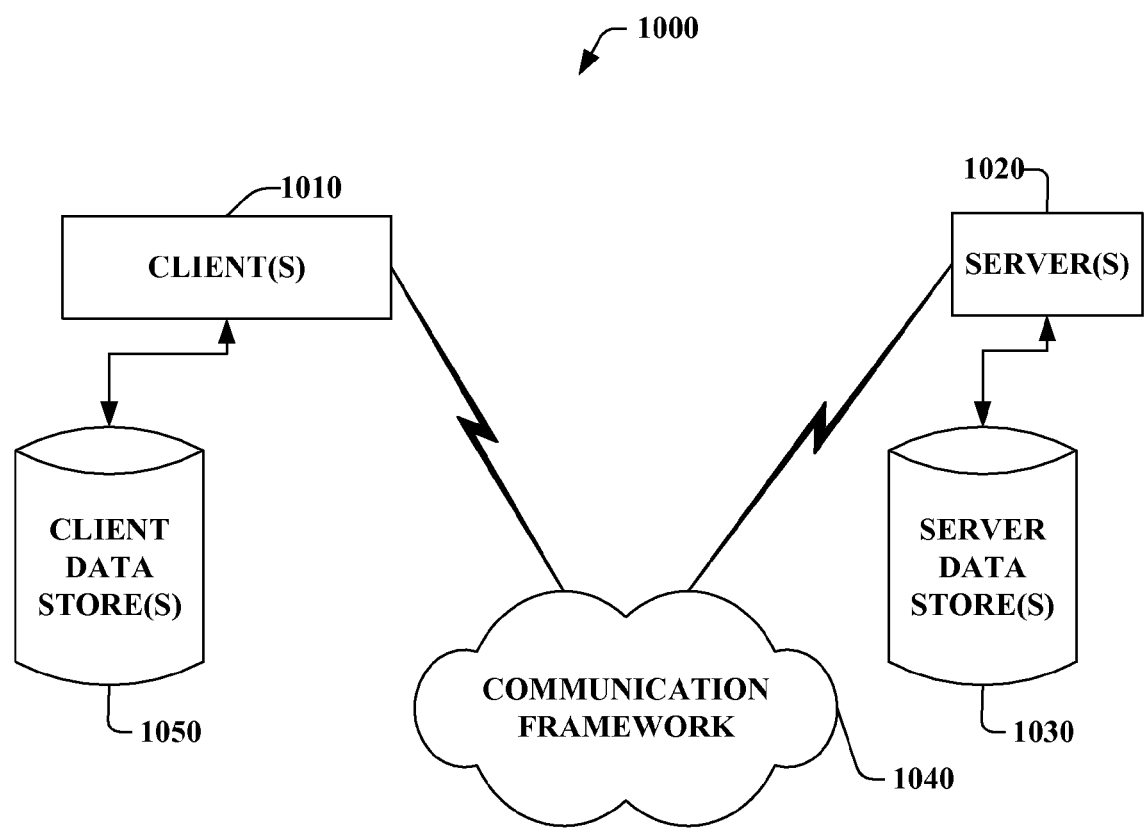
FIG. 10 illustrates an exemplary networking environment, wherein the novel aspects of the claimed subject matter can be employed.
Figure 11:
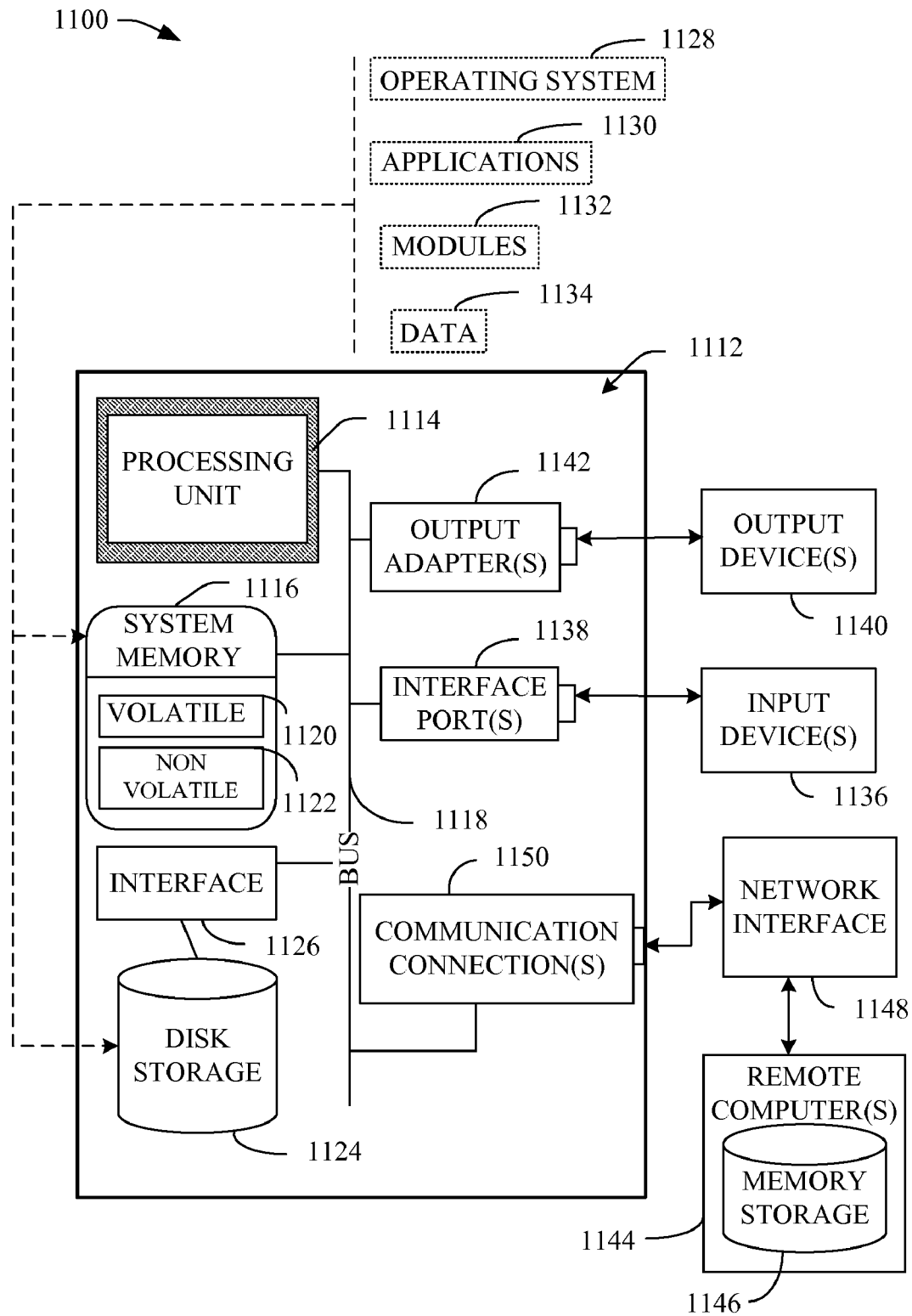
FIG. 11 illustrates an exemplary operating environment that can be employed in accordance with the claimed subject matter.

In order to provide additional context for implementing various aspects of the claimed subject matter, FIGS. 10-11 and the following discussion is intended to provide a brief, general description of a suitable computing environment in which the various aspects of the subject innovation may be implemented. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 10 is a schematic block diagram of a sample-computing environment 1000 with which the claimed subject matter can interact. The system 1000 includes one or more client(s) 1010. The client(s) 1010 can be hardware and/or software (e.g., threads, processes, computing devices). The system 1000 also includes one or more server(s) 1020. The server(s) 1020 can be hardware and/or software (e.g., threads, processes, computing devices). The servers 1020 can house threads to perform transformations by employing the subject innovation, for example.

One possible communication between a client 1010 and a server 1020 can be in the form of a data packet adapted to be transmitted between two or more computer processes. The system 1000 includes a communication framework 1040 that can be employed to facilitate communications between the client(s) 1010 and the server(s) 1020. The client(s) 1010 are operably connected to one or more client data store(s) 1050 that can be employed to store information local to the client(s) 1010. Similarly, the server(s) 1020 are operably connected to one or more server data store(s) 1030 that can be employed to store information local to the servers 1020.

With reference to FIG. 11, an exemplary environment 1100 for implementing various aspects of the claimed subject matter includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable programmable ROM (EEPROM), or flash memory. Volatile memory 1120 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1112 also includes removable/non-removable, volatile/non-volatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in the suitable operating environment 1100. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the claimed subject matter can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that provides analog control for an industrial device, comprising:
    an interface component that receives a selection of a virtual knob that controls a parameter associated with the industrial device; and
    an analog lever component communicatively coupled to the interface component that provides analog control of the parameter associated with the industrial device upon selection of the virtual knob, the analog lever component provides two dimensions of analog control, the two dimensions of analog control comprising:
        a first dimension of analog control comprising a rotary movement around the virtual knob that changes a value of the parameter of the parameter; and
        a second dimension of analog control comprising a linear movement along a radial arm from a center of the virtual knob that provides step-size manipulation associated with the value of the parameter based on a distance from the center of the virtual knob.

2. The system of claim 1, the selection is associated with at least one of the following: a mouse; a mouse pointer; a cursor; a mouse cursor; a trackball; a stylus; a pointer related to a display; a touch-screen; or a coordinate on a display on which the virtual knob is presented.

3. The system of claim 1, further comprising a device that relates to the parameter controlled by the virtual knob, wherein the device is at least one of a human machine interface (HMI), a computer, a disparate controller, a roller, a station, a welder, a scanner, a belt conveyor, a pump, a press, a fan, a furnace, a cooler, a valve, an electrical component, a drain, or a photo eye.

4. The system of claim 1, the virtual knob is associated with a human machine interface (HMI).

5. The system of claim 1, the selection of the virtual knob is based upon a cursor.

6. The system of claim 5, the analog lever component determines an initial cursor position and utilizes the initial cursor position as a set point for the two dimensions of analog control.

7. The system of claim 6, the first dimension of analog control further comprises movement of the cursor orthogonal to the radial arm and the second dimension of analog control further comprises movement of the cursor along the radial arm.

8. The system of claim 1, the first dimension of analog control further comprising at least one of a clockwise rotation or a counterclockwise rotation that correlates to at least one of an increase or a decrease in the value of the parameter.

9. The system of claim 1, the second dimension of analog control further comprising a distance from the center of the virtual knob that correlates to at least one of an increase or a decrease in the step-size.

10. The system of claim 1, further comprising a coordinate component that ascertains a first cursor location associated with the selection and continuously ascertains a second cursor location associated with the two dimensions of control.

11. The system of claim 10, the coordinate component ascertains at least one of: the cursor location associated with the selection or the cursor location associated with the two dimensions of control based upon a location on a display.

12. The system of claim 11, the display is at least one of a monitor, a human machine interface (HMI), a liquid crystal display (LCD), a flat-screen, a television, a portable digital assistant (PDA), a laptop, or a hand-held.

13. The system of claim 11, further comprising a map component that utilizes the first cursor location associated with the selection, second the cursor location associated with the two dimensions of control and the center of the virtual knob to determine an amount of variation and the step-size.

14. The system of claim 1, the interface component provides a first virtual knob that provides analog control to a first parameter and a second virtual knob that provides analog control to a second parameter.

15. The system of claim 1, wherein the knob is presented on a display and the step-size manipulation is limited by the resolution of the display.

16. The system of claim 1, wherein the rotary movement comprises one or more revolutions.

17. A method for providing analog control for an industrial device, comprising:
   receiving a cursor input associated with selecting a virtual knob;
   capturing a cursor upon receiving the cursor input associated with selecting the virtual knob;
   controlling a magnitude of a change in a parameter within an industrial device by moving the cursor along a radial arm from a center portion of the virtual knob, wherein the magnitude of the change is a function of a distance from the center portion of the virtual knob to the cursor; and
   changing a value of the parameter within the industrial device by rotating the cursor around the virtual knob.

18. The method of claim 17, changing the value of the parameter further comprising at least one of increasing or decreasing the value of the parameter within the industrial device by rotating the cursor in at least one of a counterclockwise direction or a clockwise direction.

19. The method of claim 17, wherein controlling the magnitude of the change in the parameter within the industrial environment comprises moving the cursor along the radial arm beyond the virtual knob.

20. An apparatus that provides analog control of an industrial device, comprising:
   an interface comprising at least two knobs, wherein the at least two knobs are associated with at least two parameters of an industrial device; and
   a cursor that:
      selects one of the at least two knobs and initiates the analog control of the associated parameter,
      moves a radial distance away from the center of the selected knob and adjusts a resolution for a change of a value of the parameter, wherein the resolution is a function of the distance from the center of the selected knob to the cursor,
      rotates around the selected knob and changes the value of the parameter.

21. The apparatus of claim 20, wherein the adjustment of the resolution is independent of the size of the selected knob on the interface.

22. The apparatus of claim 20, wherein the cursor rotates at least twice around the selected knob.

* * * * *